I. Hogeland,
Wool-Washing Machine.
Nº 66,839. Patented July 16, 1867.
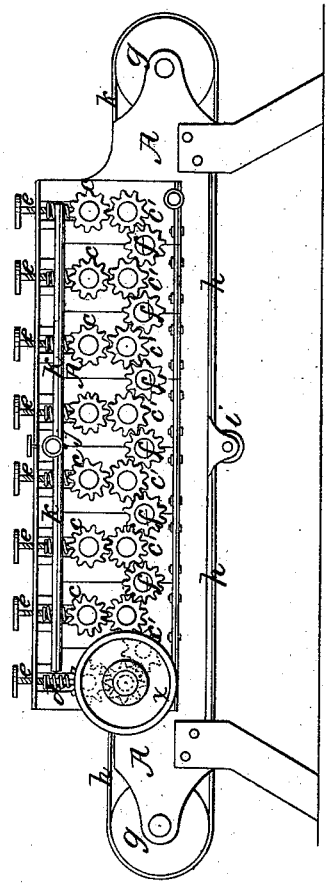
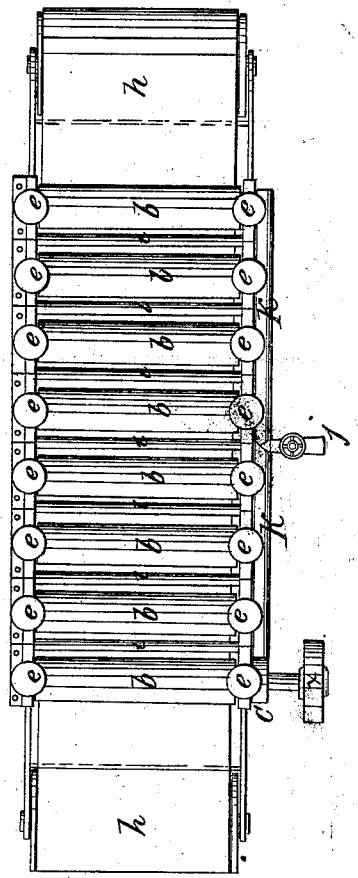
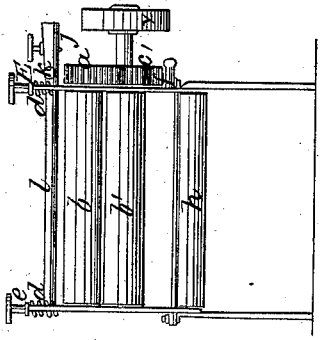
Witnesses:
Inventor;
Israel Hogeland.

United States Patent Office.

ISRAEL HOGELAND, OF LAFAYETTE, INDIANA.

Letters Patent No. 66,839, dated July 16, 1867.

---

IMPROVED WASHING AND WRINGING MACHINE.

---

The Schedule referred to in these Letters Patent and making part of the same.

---

TO ALL WHOM IT MAY CONCERN:

Be it known that I, ISRAEL HOGELAND, of the city of Lafayette, in the county of Tippecanoe, and State of Indiana, have invented a new and useful Machine for Washing and Wringing Clothes, Wool, Yarn, and Goods; and I do hereby declare that the following is a full and exact description thereof, reference being had to the accompanying drawings, and to the letters of reference marked thereon, of which—

Figure 1 represents a end view.

Figure 2, a side view; and

Figure 3, a top view.

The nature of my invention consists in constructing a machine which will wash clothes, wool, yarn, and goods, and which can be made to suit the demand of families, as well as of hotels, hospitals, laundries, &c.

To enable others skilled in the art to make and use my machine, I shall proceed to describe its construction and operation.

I construct a box, A, and place one or more pair of rollers, $b$ and $b'$, and $c\ c$, into it. Each of these rollers are provided with a cog-wheel, C or C', in such a way that the upper roller $b$ sets exactly over the lower one $b'$. The upper rollers are made adjustable by means of springs $d\ d\ d$, &c., and thumb-screws $e\ e\ e$, &c. I then place a feeding cog-wheel between each pair of the lower cog-wheels C', and a power-pulley, X, (or crank, as the case may be) to the axle of any one of the lower cog-wheels, C'. I provide each end of the box A with one large or two small rollers, $g\ g$, over which I run my apron $h\ h$ or belt. I also provide a little roller, $i$, under the box A, for the apron to run over. I provide a pipe, $j$, with a stop-cock, to supply the machine with water, which runs through the distributing pipes $k\ k$ into the small pipes $l\ l\ l$, &c. These pipes rest upon the top of box A in such a manner that the water which passes through them will drop between the rollers by means of perforations or slots on the underside of them. When the machine is in motion the power is applied to the power-pulley X, which, being on a common axle with one or the other of these lower cog-wheels C', will move it, and gear into the upper cog-wheel C, as well as into two of the feeding cog-wheels, $f\ f$, and from these cog-wheels the power is transferred to all the balance of the cog-wheels on the machine, setting all the rollers in motion. The articles to be washed are placed on the apron $h$, and drawn by it between the rollers $c$ and $c'$, the water running down upon them between each pair of rollers, cleansing them. The last pair of rollers will wring them, so that they come out of my machine washed and wrung, ready for drying and ironing.

What I claim as my invention, and desire to secure by Letters Patent of the United States, is—

The combination of the rollers $b\ b\ b$ and $b'\ b'\ b'$ with the endless apron $h$, the gearing of the cog-wheels C and C' of the springs $d$ and thumb-screws $e$, together with the perforated or slotted pipes $l\ l\ l$, &c., the apron $h$, and rollers $g\ g$, all operating substantially as set forth and described for the purpose.

ISRAEL HOGELAND.

Witnesses:
 JNO. S. SMITHMYER,
 HENRY R. HUEBNER.